(12) United States Patent
Hasui et al.

(10) Patent No.: US 10,931,038 B2
(45) Date of Patent: Feb. 23, 2021

(54) TERMINAL-ATTACHED ELECTRIC WIRE AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hiroyuki Hasui, Yokkaichi (JP); Yoshiaki Yamano, Yokkaichi (JP); Hiroshi Sudou, Yokkaichi (JP); Takayasu Sugihara, Osaka (JP); Misato Ueki, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 110 days.

(21) Appl. No.: 16/337,822

(22) PCT Filed: May 11, 2018

(86) PCT No.: PCT/JP2018/018332
§ 371 (c)(1),
(2) Date: Mar. 28, 2019

(87) PCT Pub. No.: WO2019/215914
PCT Pub. Date: Nov. 14, 2019

(65) Prior Publication Data
US 2020/0350708 A1    Nov. 5, 2020

(51) Int. Cl.
*H01R 4/62* (2006.01)
*H01R 4/02* (2006.01)
(Continued)

(52) U.S. Cl.
CPC ............. *H01R 4/625* (2013.01); *H01R 4/023* (2013.01); *B60R 16/0215* (2013.01);
(Continued)

(58) Field of Classification Search
CPC .......... H01R 13/03; H01R 43/16; H01R 4/62; H01R 4/187; H01R 4/185; H01R 4/625;
(Continued)

(56) References Cited

FOREIGN PATENT DOCUMENTS

| EP | 1291992 A1 | 12/2003 |
|----|-----------|---------|
| JP | 2010-257719 A | 11/2010 |

(Continued)

*Primary Examiner* — Abdullah A Riyami
*Assistant Examiner* — Justin M Kratt
(74) *Attorney, Agent, or Firm* — Baker Botts L.L.P.; Michael A. Sartori (57) ABSTRACT

Provided is a terminal-attached electric wire including: an electric wire having a conductor made of aluminum or an aluminum alloy whose outer circumference is covered with an insulating layer; and a terminal member made of copper or a copper alloy and attached to a conductor-exposed portion exposed from the insulating layer at an end portion of the electric wire. The terminal member includes a coating layer made of an electrically conductive material and formed at a terminal-exposed portion except for a place of contact with the conductor in a surface of the terminal member, and an oxide film of the electrically conductive material formed in a surface of the coating layer. The electrically conductive material is a metal or an alloy which forms an oxide film having a thickness of more than or equal to 20 nm in a surface thereof.

7 Claims, 5 Drawing Sheets

(51) Int. Cl.
| | |
|---|---|
| B60R 16/02 | (2006.01) |
| H01R 12/70 | (2011.01) |
| H01R 43/16 | (2006.01) |
| H01R 13/03 | (2006.01) |
| H01R 4/18 | (2006.01) |
| H01R 4/34 | (2006.01) |
| H01R 13/58 | (2006.01) |
| H01R 9/05 | (2006.01) |
| H01R 4/48 | (2006.01) |
| H01R 11/12 | (2006.01) |
| H01R 43/048 | (2006.01) |

(52) U.S. Cl.
CPC ............... *H01R 4/029* (2013.01); *H01R 4/18* (2013.01); *H01R 4/183* (2013.01); *H01R 4/184* (2013.01); *H01R 4/185* (2013.01); *H01R 4/187* (2013.01); *H01R 4/34* (2013.01); *H01R 4/4818* (2013.01); *H01R 4/62* (2013.01); *H01R 9/05* (2013.01); *H01R 11/12* (2013.01); *H01R 12/707* (2013.01); *H01R 13/03* (2013.01); *H01R 13/5808* (2013.01); *H01R 43/048* (2013.01); *H01R 43/16* (2013.01); *H01R 2201/26* (2013.01)

(58) Field of Classification Search
CPC .......... H01R 11/12; H01R 4/029; H01R 4/36; H01R 9/05; H01R 12/707; H01R 13/5808; H01R 2201/26; H01R 43/048; H01R 4/18; H01R 4/183; H01R 4/184; H01R 4/34; H01R 4/4818; H01R 4/023; H01R 4/02; B60R 16/0215
USPC .......................................... 439/874, 884–888
See application file for complete search history.

(56) References Cited

FOREIGN PATENT DOCUMENTS

| JP | 2011-165618 A | | 8/2011 |
|---|---|---|---|
| JP | 2011165618 A | * | 8/2011 |
| WO | 02/071563 A1 | | 9/2002 |

\* cited by examiner

TERMINAL-ATTACHED ELECTRIC WIRE AND WIRE HARNESS

TECHNICAL FIELD

The present invention relates to a terminal-attached electric wire and a wire harness.

BACKGROUND ART

PTL 1 discloses a terminal-attached electric wire including an electric wire having a conductor whose outer circumference is covered with an insulating layer, and a terminal member attached to a conductor-exposed portion exposed from the insulating layer at an end portion of the electric wire. The conductor is made of an aluminum alloy, and the terminal member is made of copper or a copper alloy. In this terminal-attached electric wire, corrosion of the conductor is suppressed by covering a portion of the terminal member with an insulating material such as resin.

CITATION LIST

Patent Literature

PTL 1: Japanese Patent Laying-Open No. 2010-257719

SUMMARY OF INVENTION

A terminal-attached electric wire of the present disclosure includes:
an electric wire having a conductor made of aluminum or an aluminum alloy whose outer circumference is covered with an insulating layer; and
a terminal member made of copper or a copper alloy, and attached to a conductor-exposed portion exposed from the insulating layer at an end portion of the electric wire,
the terminal member including
a coating layer made of an electrically conductive material, and formed at a terminal-exposed portion except for a place of contact with the conductor in a surface of the terminal member, and
an oxide film of the electrically conductive material formed in a surface of the coating layer,
the electrically conductive material being a metal or an alloy which forms an oxide film having a thickness of more than or equal to 20 nm in a surface thereof when 50 g/L of salt water at 35° C. is sprayed for 96 hours in conformity with a salt water spray test defined by JIS Z 2371:2000,
the conductor-exposed portion and the terminal-exposed portion being bare and exposed to an outer circumferential atmosphere of the terminal-attached electric wire.

A wire harness of the present disclosure includes a plurality of the terminal-attached electric wires of the present disclosure which are bundled together.

DETAILED DESCRIPTION

Problem to be Solved by the Present Disclosure

A terminal-attached electric wire is used for a mobile apparatus such as a car and an airplane, and for an industrial apparatus such as a robot. In these fields, the terminal-attached electric wire is often used in the form of a wire harness including a plurality of terminal-attached electric wires bundled together, and the terminal-attached electric wires account for a large percentage in an apparatus. In particular in the field of mobile apparatuses, with consideration for the environment, there is a demand for a lighter terminal-attached electric wire in order to improve fuel efficiency of the mobile apparatuses. Accordingly, decreasing the weight of a terminal-attached electric wire by using a conductor made of an aluminum alloy is performed, as in the terminal-attached electric wire in PTL 1. However, a terminal-attached electric wire having a conductor made of an aluminum alloy and a terminal member made of copper or a copper alloy has a problem that a cell is formed between the conductor and the terminal member and the conductor corrodes. In order to solve the problem, in a conventional terminal-attached electric wire including the one in PTL 1, an insulating member or the like made of resin is provided in the vicinity of a junction between the conductor and the terminal member to suppress corrosion of the conductor. However, this measure has a problem that time, effort, and cost for post-installing the insulating member are required, and a problem that the advantage of the weight decrease achieved by using an aluminum alloy lighter than copper is impaired.

Therefore, one object of the present disclosure is to provide a terminal-attached electric wire which can be easily manufactured and is excellent in corrosion resistance, and a wire harness.

Description of Embodiment of the Invention of the Present Application

First, the contents of an embodiment of the invention of the present application will be described in list form.

<1> A terminal-attached electric wire in accordance with the embodiment includes:
an electric wire having a conductor made of aluminum or an aluminum alloy whose outer circumference is covered with an insulating layer; and a terminal member made of copper or a copper alloy, and attached to a conductor-exposed portion exposed from the insulating layer at an end portion of the electric wire, the terminal member including
a coating layer made of an electrically conductive material, and formed at a terminal-exposed portion except for a place of contact with the conductor in a surface of the terminal member, and
an oxide film of the electrically conductive material formed in a surface of the coating layer,
the electrically conductive material being a metal or an alloy which forms an oxide film having a thickness of more than or equal to 20 nm in a surface thereof when 50 g/L of salt water at 35° C. is sprayed for 96 hours in conformity with a salt water spray test defined by JIS Z 2371:2000,
the conductor-exposed portion and the terminal-exposed portion being bare and exposed to an outer circumferential atmosphere of the terminal-attached electric wire.

The terminal-attached electric wire described above is excellent in corrosion resistance. This is because the oxide film formed in the outermost layer of the terminal member decreases a current which flows through the surface of the terminal member and reduces oxygen (an oxygen reduction current), and suppresses a cell reaction between the conductor and the terminal member. Suppressing the cell reaction can suppress corrosion of aluminum or the aluminum alloy constituting the conductor and a resultant decrease in the electrical conductivity of the terminal-attached electric wire. The finding that such an oxide film has a function of fully suppressing corrosion of the conductor has not conventionally be known.

The terminal-attached electric wire described above is excellent in productivity. This is because the oxide film which effectively suppresses corrosion of the conductor covers the terminal-exposed portion, and thereby both the conductor-exposed portion and the terminal-exposed portion are bare and exposed to the outer circumferential atmosphere. That is, there is no need to provide a conventional insulating member which covers the vicinity of a junction between the conductor and the terminal member, and thus time, effort, and cost for arranging the insulating member can be decreased. In addition, the oxide film which suppresses corrosion of the conductor is formed by oxidizing a portion of the coating layer of the electrically conductive material formed in the surface of the terminal member. Accordingly, the terminal-attached electric wire can be completed simply by forming the coating layer in the surface of the terminal member and joining the terminal member to the conductor, and the terminal-attached electric wire can be fabricated with high productivity.

The terminal-attached electric wire described above is lighter in weight than a conventional terminal-attached electric wire. This is because the terminal-attached electric wire described above does not have an insulating member which covers the vicinity of the junction between the conductor and the terminal member, and thus the terminal-attached electric wire described above is lighter in weight than the conventional one by the weight of the insulating member. In particular, since a wire harness has a large number of terminal members, elimination of an insulating member contributes significantly to a decrease in the weight of the wire harness.

Here, when a portion connecting the terminal-attached electric wire to an external terminal is arranged inside a case or the like having a waterproof structure, the conductor of the terminal-attached electric wire is primarily less likely to corrode. However, the conductor of the terminal-attached electric wire in accordance with the embodiment is less likely to corrode even when the terminal-attached electric wire is used in a non-waterproof environment where environmental water (such as the moisture in the air, rain, and muddy water in a puddle) is likely to adhere to the junction between the conductor and the terminal member thereof. Examples of the non-waterproof environment can include an engine compartment of a car, and the like.

<2> As one form of the terminal-attached electric wire in accordance with the embodiment, a form in which the electrically conductive material is nickel, a nickel alloy, titanium, a titanium alloy, chromium, a chromium alloy, or stainless steel can be presented.

Since the above metal or alloy has an oxidation-reduction potential lower than that of copper, a potential difference of a cell formed between the conductor and the terminal member can be decreased. Accordingly, when the above metal or alloy is adopted as the electrically conductive material of the coating layer, corrosion of the conductor is easily suppressed.

<3> As one form of the terminal-attached electric wire in accordance with the embodiment, a form in which the coating layer is made of a nickel plating or a nickel alloy plating can be presented.

Nickel or a nickel alloy is inexpensive and easily available. In addition, when nickel or a nickel alloy is formed as a plating, a thin and uniform coating layer can be easily formed in the surface of the terminal member.

<4> As one form of the terminal-attached electric wire in accordance with the embodiment, a form in which the conductor has a cross sectional area of more than or equal to 10 mm$^2$ can be presented.

When the conductor has a cross sectional area of more than or equal to 10 mm$^2$, the terminal-attached electric wire can be suitably used for a wire harness and the like used for a mobile apparatus such as a car.

<5> As one form of the terminal-attached electric wire in accordance with the embodiment, a form in which the conductor is ultrasonic-welded to the terminal member can be presented.

Ultrasonic welding can easily decrease a junction resistance between the conductor and the terminal member, when compared with other joining methods such as crimping. This is because an Al passivation film in a surface of the conductor and the oxide film in the surface of the terminal member are broken during ultrasonic welding, and the conductor and the terminal member closely adhere to each other without any gap. In addition, even when the conductor includes a plurality of element wires, ultrasonic welding can easily secure conduction between the element wires. Ultrasonic welding is a very effective joining method in particular when the conductor having a cross sectional area of more than or equal to 10 mm$^2$ and including a plurality of element wires is joined to the terminal member. This is because the element wires are melted and unified during ultrasonic welding, and a junction resistance between the element wires is decreased.

<6> As one form of the terminal-attached electric wire in accordance with the embodiment, a form in which the oxide film has a thickness of more than or equal to 20 nm can be presented.

When the oxide film of the terminal member has a thickness of more than or equal to 20 nm, corrosion of the conductor of the electric wire can be effectively suppressed. The oxide film having a thickness of more than or equal to 20 nm may be formed by oxidation over time after the terminal-attached electric wire is attached to an apparatus, or may be artificially formed before the terminal-attached electric wire is attached to the apparatus. Here, although the oxide film may have a thickness of more than or equal to 20 nm by oxidation over time of the electrically conductive material constituting the coating layer, long years are required to reach that thickness. Since corrosion of the conductor gradually proceeds until the oxide film grows to have a thickness of more than or equal to 20 nm, it is preferable to grow the oxide film to have a thickness of more than or equal to 20 nm by heat-treating the entire terminal member during manufacturing of the terminal-attached electric wire, for example.

<7> A wire harness in accordance with the embodiment includes a plurality of the terminal-attached electric wires in any of <1> to <6> described above, which are bundled together.

The wire harness described above is lightweight and excellent in productivity and corrosion resistance. This is because each terminal-attached electric wire constituting the wire harness is lightweight and excellent in productivity and corrosion resistance.

Details of Embodiment of the Invention of the Present Application

A concrete example of the terminal-attached electric wire in accordance with the embodiment of the invention of the present application will be described with reference to FIGS. 1 to 3. The same reference numerals in the drawings will designate identical or corresponding parts. It should be noted that the invention of the present application is not limited to these illustrations but defined by the scope of the claims, and is intended to include any modifications within the scope and meaning equivalent to the scope of the claims.

First Embodiment

Figure 1:
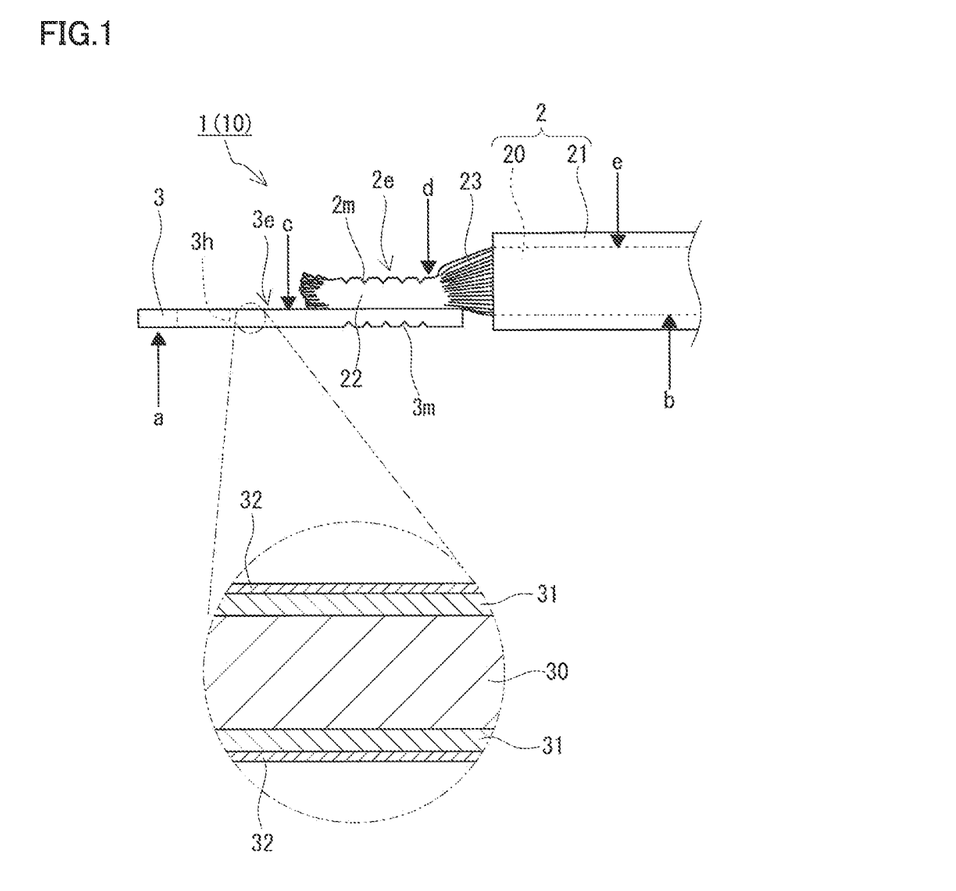
FIG. 1 is a schematic configuration diagram of a wire harness and a terminal-attached electric wire in accordance with an embodiment.
Figure 2:
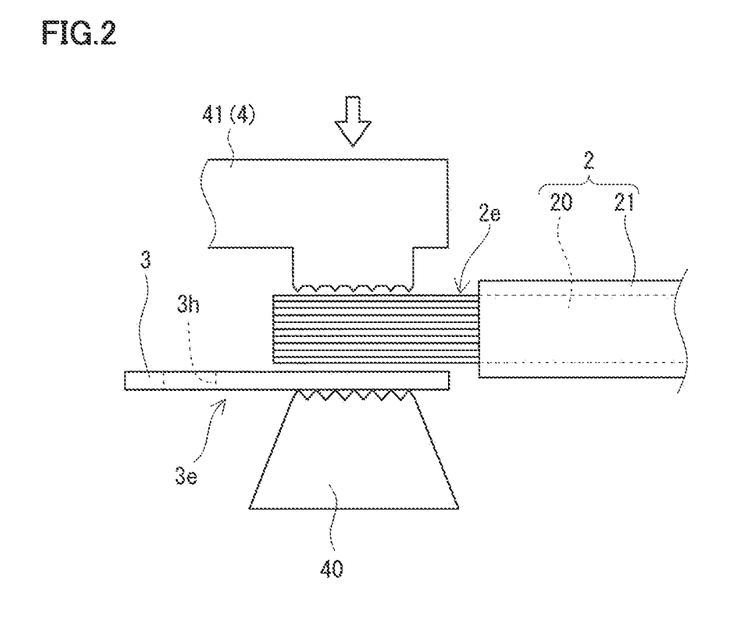
FIG. 2 is a schematic explanatory diagram showing an example of a method for manufacturing the terminal-attached electric wire in accordance with the embodiment.

A wire harness 10 of the embodiment shown in FIG. 1 includes a plurality of terminal-attached electric wires 1 bundled together. FIG. 1 shows only an end portion of one terminal-attached electric wire 1. At the end portion of each terminal-attached electric wire 1, an electric wire 2 and a terminal member 3 are joined electrically and mechanically. In the following, each component of terminal-attached electric wire 1 will be described.

<<Electric Wire>>

Electric wire 2 includes a conductor 20, and an insulating layer 21 formed around an outer circumference thereof. At an end portion of electric wire 2, insulating layer 21 is removed and a portion of conductor 20 is exposed. A conductor-exposed portion 2e in which conductor 20 is exposed is joined to terminal member 3 described later.

[Conductor]

Conductor 20 of electric wire 2 is made of aluminum (Al) or an Al alloy. As the Al alloy, Al alloys having various compositions containing an additive element and the remainder including Al and an inevitable impurity can be used. Examples of the additive element include one or more selected from Fe, Mg, Si, Cu, Zn, Ni, Mn, Ag, Cr, and Zr. The Al alloy described above may further contain at least one of Ti and B which miniaturizes the crystal structure of the Al alloy. The total content of the additive element is preferably more than or equal to 0.005 mass % and less than or equal to 5.0 mass %, and is more preferably more than or equal to 0.1 mass % and less than or equal to 2.0 mass %. The preferable content of each element is as follows (unit: mass %): Fe: more than or equal to 0.005% and less than or equal to 2.2%; Mg: more than or equal to 0.05% and less than or equal to 1.0%; Mn, Ni, Zr, Zn, Cr, and Ag: more than or equal to 0.005% and less than or equal to 0.2% in total; Cu: more than or equal to 0.05% and less than or equal to 0.5%; Si: more than or equal to 0.04% and less than or equal to 1.0%. These additive elements may be contained alone or in a combination of two or more. Examples of such an alloy include an Al—Fe alloy, an Al—Fe—Mg alloy, an Al—Fe—Si alloy, an Al—Fe—Mg—(Mn, Ni, Zr, Ag) alloy, an Al—Fe—Cu alloy, an Al—Fe—Cu—(Mg, Si) alloy, an Al—Mg—Si—Cu alloy, and the like.

Conductor 20 may be, for example, a solid wire made of Al or an Al alloy, or a stranded wire formed by stranding a plurality of element wires as shown in FIG. 1. The standard established by the Society of Automotive Engineers of Japan (see JASO D603:2015) defines conductor 20 formed by stranding a plurality of element wires each having a wire diameter of 0.32 mm. The cross sectional area of conductor 20 defined by JASO D603:2015 is 3 mm$^2$, 5 mm$^2$, 8 mm$^2$, 10 mm$^2$, 12 mm$^2$, 16 mm$^2$, 20 mm$^2$, 25 mm$^2$, 30 mm$^2$, 35 mm$^2$, 40 mm$^2$, 50 mm$^2$, 60 mm$^2$, 70 mm$^2$, 85 mm$^2$, 95 mm$^2$, or 100 mm$^2$. Of course, conductor 20 of the present embodiment is not necessarily limited by the JASO standard. In a surface of conductor 20 (surfaces of the element wires), only an Al passivation film is formed, and there is no other artificially added film.

Examples of the method of joining conductor 20 described above and terminal member 3 described later can include crimping, or welding using resistance heating or ultrasonic waves, and the like. In particular, ultrasonic welding is preferable as a method of joining conductor 20 and terminal member 3. Ultrasonic welding can decrease the junction resistance between conductor 20 and terminal member 3, and even when conductor 20 includes a plurality of element wires, ultrasonic welding can sufficiently secure conduction between the element wires. This is because, in ultrasonic welding by which conductor 20 and terminal member 3 rub against each other vigorously, the Al passivation film in the surface of each element wire, and a coating layer 31 and an oxide film 32 of terminal member 3 described later are easily broken.

An example of ultrasonic welding will be described based on FIG. 2. An ultrasonic welding machine 4 in FIG. 2 includes an immovable receiving jig 40 (also referred to as an anvil), and a horn 41 configured to be vibratable. Terminal member 3 and conductor 20 can be joined by moving horn 41 in a pressing direction indicated by a white arrow, sandwiching terminal member 3 and conductor 20 between receiving jig 40 and horn 41, and vibrating horn 41 back and forth in a direction orthogonal to the pressing direction. In a portion of conductor-exposed portion 2e of conductor 20 which is sandwiched between receiving jig 40 and horn 41, a welded portion 22 (FIG. 1) in which the element wires are melted and unified is formed, and a portion other than that serves as an electric wire portion 23 (FIG. 1) in which the element wires are independent. Here, anti-slip asperities are formed in contact surfaces of receiving jig 40 and horn 41 which are provided to come into contact with objects to be welded. The asperities are transferred to the objects to be welded, and form weld marks in surfaces of the objects to be welded. Accordingly, a weld mark 2m in the shape of streaks formed in welded portion 22 of conductor 20 and a weld mark 3m in the shape of streaks formed in a back surface of terminal member 3 as shown in FIG. 1 indicate that conductor 20 has been ultrasonic welded to terminal member 3.

As another joining method, a plurality of element wires constituting conductor 20 may be unified by ultrasonic welding, and thereafter welded portion 22 formed of the unified element wires may be crimped to terminal member 3. Since weld mark 2m is also formed in welded portion 22 of conductor 20 in that case, it can be visually confirmed that the plurality of element wires have been unified by ultrasonic welding.

[Insulating Layer]

Examples of the constituent material for insulating layer 21 provided around the outer circumference of conductor 20 include polyvinyl chloride (PVC), a non-halogen resin, an insulating material excellent in flame retardancy, and the like. The material for and the thickness of the insulating layer can be selected as appropriate in consideration of a desired insulation strength, and are not particularly limited.

<<Terminal Member>>

Terminal member 3 is a metal fitting for electrically connecting electric wire 2 described above to the external terminal of an external apparatus. The shape of terminal member 3 is not particularly limited, and is a flat plate in this example. Alternatively, terminal member 3 may have a form provided with a barrel for storing conductor-exposed portion 2e of electric wire 2, as with a conventional crimp-style terminal.

Terminal member 3 has a conductor attachment portion to come into contact with conductor-exposed portion 2e on one end side (on the right in the drawing), and has an external coupling portion to be coupled to the external terminal described above on the other end side (on the left in the drawing). Although the conductor attachment portion in this example is flat plate-shaped, it may be provided with a barrel as with the crimp-style terminal. Further, the external coupling portion in this example is flat plate-shaped, and has a through hole 3h for screw fixing formed therein, and thus the external terminal can be stacked on terminal member 3 and fixed by a screw. Unlike this example, a male terminal or a female terminal may be formed in the external coupling portion.

As shown in an enlarged view surrounded by a circle, terminal member 3 includes a main body 30 made of copper or a copper alloy, coating layer 31 formed around an outer circumference of main body 30, and oxide film 32 further formed around an outer circumference of coating layer 31. Examples of the copper alloy constituting main body 30 include brass (a Cu—Zn alloy), a Cu—Sn alloy, a Cu—Fe alloy, a Cu—Ni—Sn alloy, a Cu—Fe—P alloy, and the like.

[Coating Layer]

Coating layer 31 is a layer made of an electrically conductive material, and is provided to suppress corrosion of conductor 20 to be joined to terminal member 3. More precisely, coating layer 31 does not suppress corrosion of conductor 20, but oxide film 32 formed as a result of oxidation of the electrically conductive material constituting coating layer 31 suppresses corrosion of conductor 20. Coating layer 31 is formed at a terminal-exposed portion 3e except for a place of contact with conductor 20 in terminal member 3. Although conductor 20 may be provided at an entire surface of terminal-exposed portion 3e, conductor 20 only has to be formed at least at a region within a predetermined range from a boundary of the place of contact with conductor 20 in terminal-exposed portion 3e. In actual manufacturing, coating layer 31 is formed around the outer circumference of main body 30 and thereafter terminal member 3 is joined to conductor 20 of electric wire 2, and thus it may be considered that coating layer 31 is formed at the entire surface of terminal-exposed portion 3e. When terminal member 3 having coating layer 31 formed around the outer circumference of main body 30 is joined to conductor 20, coating layer 31 interposed between terminal member 3 and conductor 20 is broken in association with the joining operation. It is permitted that a portion of coating layer 31 remains between terminal member 3 and conductor 20.

The electrically conductive material which forms coating layer 31 is a metal or an alloy which forms an oxide film having a thickness of more than or equal to 20 nm in a surface thereof when 50 g/L of salt water at 35° C. is sprayed for 96 hours in conformity with a salt water spray test defined by JIS Z 2371:2000. Concrete examples of the electrically conductive material can include Ni, a Ni alloy, Ti, a Ti alloy, Cr, a Cr alloy, or stainless steel, and the like. Since the above metal or alloy has an oxidation-reduction potential lower than that of copper, a potential difference of a cell formed between conductor 20 and terminal member 3 can be decreased, and corrosion of conductor 20 is easily suppressed. In particular, Ni is inexpensive and easily available, and coating layer 31 can be easily formed by plating Ni. Therefore, Ni is preferable as an electrically conductive material of coating layer 31.

Coating layer 31 can have a thickness of more than or equal to 0.1 μm and less than or equal to 30 μm. When coating layer 31 has a thickness of more than or equal to 0.1 μm, oxide film 32 which suppresses corrosion of conductor 20 can fully be grown. When coating layer 31 has a thickness of less than or equal to 30 μm, coating layer 31 can be formed in a relatively short time. More preferably, coating layer 31 has a thickness of more than or equal to 2 μm and less than or equal to 10 μm.

The method of forming coating layer 31 can be selected as appropriate depending on the electrically conductive material constituting coating layer 31. Examples of the method of forming coating layer 31 can include plating, vapor deposition such as a CVD method and a PVD method, and the like. Plating such as electroplating, electroless plating, and hot-dip plating can easily form coating layer 31.

[Oxide Film]

In a surface of coating layer 31, oxide film 32 formed as a result of oxidation of the electrically conductive material of coating layer 31 is formed. Oxide film 32 is formed in the entire surface of coating layer 31 to decrease an oxygen reduction current in a surface of terminal member 3. The oxygen reduction current is a current which reduces oxygen ($O_2$) in the surface of terminal member 3 when environmental water 5 adheres from terminal member 3 to conductor 20 as shown in FIG. 3. Since electrons (e−) of the oxygen reduction current are provided when Al is oxidized and changed to $Al^{3+}$, conductor 20 corrodes. Oxide film 32 described above can decrease the oxygen reduction current depending on the thickness thereof. According to the study by the inventors of the present application, it has been found that the effect of suppressing corrosion of conductor 20 achieved by the decrease of the oxygen reduction current by oxide film 32 is satisfactory enough to eliminate the necessity of covering conductor-exposed portion 2e and terminal-exposed portion 3e of terminal-attached electric wire 1 with a certain insulating member. Therefore, in terminal-attached electric wire 1 of the embodiment shown in FIG. 1, conductor-exposed portion 2e and terminal-exposed portion 3e are bare and exposed to an outer circumferential atmosphere of terminal-attached electric wire 1.

Oxide film 32 may be formed by natural oxidation of the electrically conductive material, or may be formed by artificially promoting oxidation of the electrically conductive material and increasing the thickness thereof. Oxide film 32 formed by natural oxidation has a thickness of about 5 nm to 6 nm. As described in test examples described later, the oxygen reduction current is decreased as oxide film 32 becomes thicker, and thus corrosion of conductor 20 can be effectively suppressed. From that viewpoint, oxide film 32 preferably has a thickness of more than or equal to 20 nm.

Although oxide film 32 may have a thickness of more than or equal to 20 nm by oxidation over time of the electrically conductive material constituting coating layer 31, long years are required to reach that thickness. Since corrosion of conductor 20 gradually proceeds until oxide film 32 grows to have a thickness of more than or equal to 20 nm, it is preferable to grow the oxide film to have a thickness of more than or equal to 20 nm by heat-treating entire terminal member 3 during manufacturing of terminal-attached electric wire 1, for example.

<<Effect>>

Terminal-attached electric wire 1 of this example described above is excellent in corrosion resistance. This is because, as already mentioned, oxide film 32 formed in the outermost layer of terminal member 3 decreases the oxygen reduction current which reduces oxygen in the surface of terminal member 3, and suppresses a cell reaction between conductor 20 and terminal member 3. Suppressing the cell reaction can suppress corrosion of conductor 20 and a resultant decrease in the electrical conductivity of terminal-attached electric wire 1.

Terminal-attached electric wire 1 of this example is excellent in productivity. This is because, since oxide film 32 is formed in terminal member 3, there is no need to provide a conventional insulating member which covers the vicinity of a junction between conductor 20 and terminal member 3, and thus time, effort, and cost for arranging the insulating member can be decreased. In addition, terminal-attached electric wire 1 of this example can be completed simply by forming coating layer 31 in the surface of terminal member 3 and joining terminal member 3 to conductor 20.

Terminal-attached electric wire 1 of this example is lighter in weight than a conventional terminal-attached electric wire. This is because terminal-attached electric wire 1 of this example does not have an insulating member which covers the vicinity of the junction between conductor 20 and terminal member 3, and thus terminal-attached electric wire 1 of this example is lighter in weight than the conventional one by the weight of the insulating member. In particular, since wire harness 10 has a large number of terminal members 3, elimination of an insulating member contributes significantly to a decrease in the weight of wire harness 10.

<<Application>>

Terminal-attached electric wire 1 and wire harness 10 of the embodiment are suitably applicable to various fields in which weight decrease is desired, in particular, to cars in which further weight decrease is desired in order to improve fuel efficiency. Terminal-attached electric wire 1 and wire harness 10 of the embodiment are also applicable, in particular, to a non-sealed environment which is not isolated from the air, as well as a non-waterproof environment which does not have a waterproof structure in a strict sense, such as an engine compartment of a car.

Test Examples

Corrosion resistance of terminal-attached electric wire 1 in accordance with the first embodiment was examined as described below.

<<Test 1>>

A test 1 examined the influence of the presence or absence of a coating layer in a terminal member on corrosion of a terminal-attached electric wire, and the influence of corrosion of a conductor on the electrical conductivity of the terminal-attached electric wire.

For the test, a plurality of terminal-attached electric wires each including a coating layer made of a Ni plating (plated samples), and a plurality of terminal-attached electric wires each not including a coating layer (non-plated samples) were prepared. In both the plated samples and the non-plated samples, conductors had a cross sectional area of 20 mm$^2$. In addition, both the plated samples and the non-plated samples were fabricated by joining a conductor to a terminal member by ultrasonic welding. The Ni plating of each plated sample had a thickness of about 3 μm. Here, since the plated samples and the non-plated samples were different only in the presence or absence of the coating layer and an oxide film formed in a surface thereof, FIG. 1 will be referred to in the following for the description of both the plated samples and the non-plated samples.

To the prepared plated samples and non-plated samples, 50 g/L of salt water at 35° C. was sprayed for a predetermined time in conformity with a salt water spray test defined by JIS Z 2371:2000. Each sample was arranged in a testing machine such that an end portion of terminal-attached electric wire 1 to which terminal member 3 was attached faced upward. The salt water spray time for the non-plated samples was set to 24, 48, 72, 96, 120, 144, 168, 192, 216, or 240 hours, and the salt water spray time for the plated samples was set to 48, 96, 144, 192, 240, 288, 336, 384, 432, or 480 hours. The number of samples for each time was set to 5.

Figure 4:
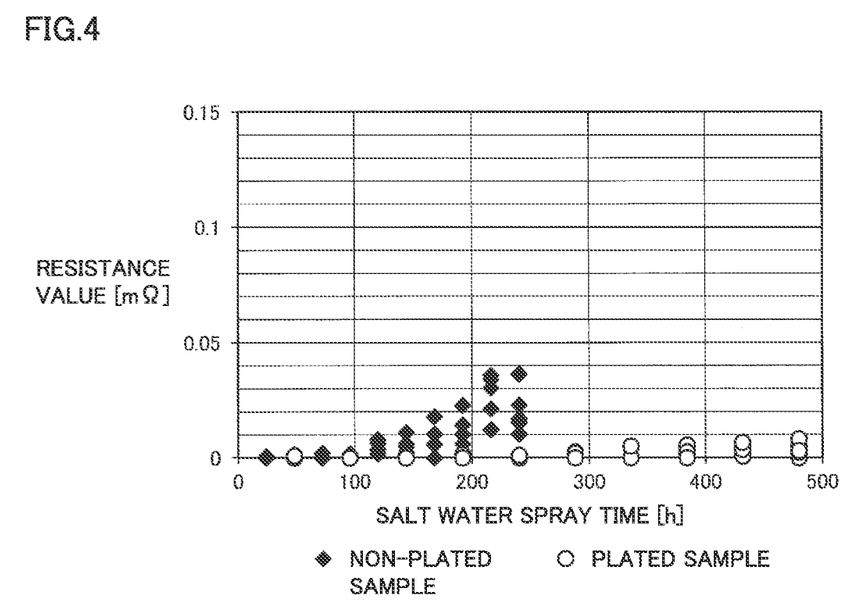
FIG. 4 is a graph of a test 1 showing the relation between salt water spray time and a resistance value of the entire terminal-attached electric wire.
Figure 5:
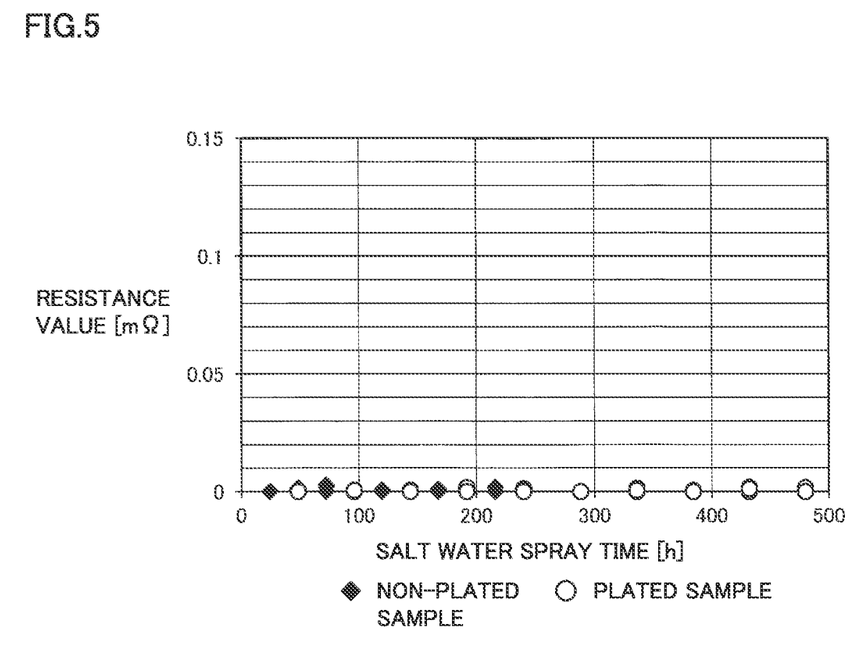
FIG. 5 is a graph of test 1 showing the relation between the salt water spray time and a resistance value of a welded portion of the terminal-attached electric wire.

As a result of visually observing each sample subjected to salt water spray, it was found that corrosion occurred at the position of electric wire portion 23 in FIG. 1. Furthermore, a constant current power source was connected between a and b indicated by arrows in FIG. 1 in each sample, and voltages between c and e and between d and e were measured. Point a is the position of a tip of terminal member 3, point b is the position covered with insulating layer 21 in conductor 20, point c is the position in the vicinity of conductor-exposed portion 2e in terminal-exposed portion 3e, point d is the position in the vicinity of electric wire portion 23 in welded portion 22, and point e is the position which is covered with insulating layer 21 and is closer to terminal member 3 than point b. Based on an electric current value of the constant current power source and measured pressure values, resistance values (mΩ) between c and e and between d and e were obtained by calculation. FIG. 4 shows the resistance value between c and e, and FIG. 5 shows a value obtained by subtracting the resistance value between d and e from the resistance value between c and e, that is, a resistance value between c and d. In FIGS. 4 and 5, the axis of abscissas represents the salt water spray time (h: hours), and the axis of ordinates represents the resistance value (mΩ) at the measurement place. The plot with circular marks represents the plated samples, and the plot with rhombic marks represents the non-plated samples.

As shown in FIG. 4, in the non-plated samples, a significant increase in resistance value was observed when salt water spray was performed for 120 hours. On the other hand, in the plated samples, a significant increase in resistance value was observed only after salt water spray was performed for 480 hours. This result revealed that corrosion of conductor 20 of electric wire 2 can be effectively suppressed by forming a Ni plating in the terminal member.

In addition, as shown in FIG. 5, an increase in resistance value did not occur between c and d despite an increase in the length of the salt water spray time. That is, it was found that corrosion of conductor 20 occurred at the position of electric wire portion 23 as visually confirmed, and corrosion hardly occurred in welded portion 22.

<<Test 2>>

A test 2 examined how much corrosion of conductor 20 would cause an increase in the resistance value of terminal-attached electric wire 1.

Also in test 2, a plurality of plated samples and non-plated samples were prepared, as in test 1. Then, salt water spray was performed on the plated samples and the non-plated samples under the same conditions as those for test 1. The salt water spray time for the non-plated samples was set to 24, 48, 72, 96, or 216 hours, and the salt water spray time for the plated samples was set to 48, 96, 144, 336, or 432 hours. The number of samples for each time was set to 1.

Figure 6:
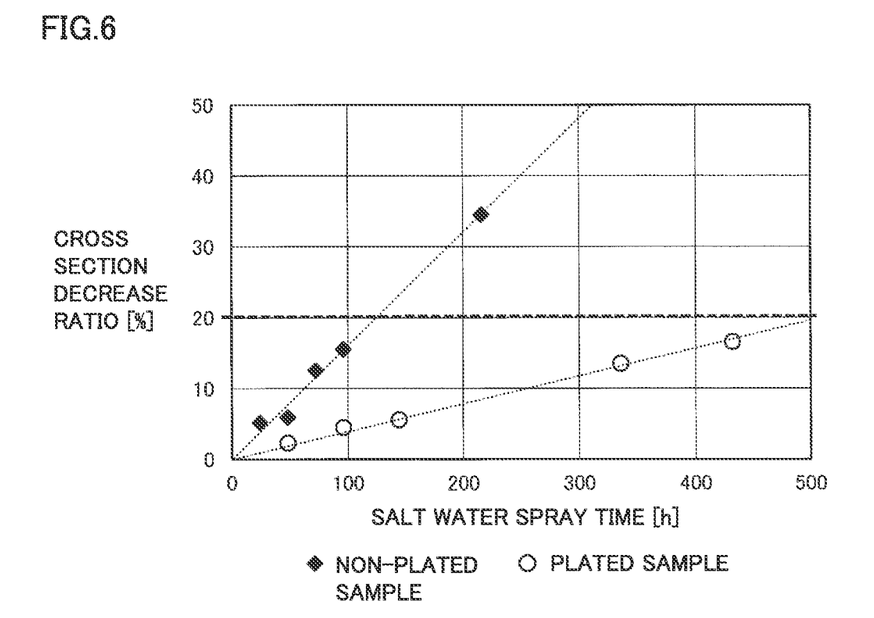
FIG. 6 is a graph of a test 2 showing the relation between the salt water spray time and a cross section decrease ratio of an electric wire portion of the terminal-attached electric wire.

Since it was found in test 1 that corrosion of conductor 20 occurred at electric wire portion 23, test 2 examined a cross section decrease ratio (%) of each sample by cutting electric wire portion 23 in each sample subjected to salt water spray and observing a cross section thereof. The cross section decrease ratio is obtained by {(cross sectional area of conductor 20 before the test)−(cross sectional area of remaining conductor 20)/(cross sectional area of conductor 20 before the test)}×100. However, as for the cross sectional area of conductor 20 before the test, cross sectional areas of samples (n=30) different from the samples which were actually subjected to salt water spray were measured, and an average value thereof was used. A cross sectional area can be easily obtained by performing image processing or the like on a photograph of a cross section. The result is shown in the graph of FIG. 6. In FIG. 6, the axis of abscissas represents the salt water spray time (h), and the axis of ordinates represents the cross section decrease ratio (%) of conductor 20.

FIG. 6 shows a correlation straight line indicating the relation between the salt water spray time and the cross section decrease ratio, by a least square method, from a plot of the cross section decrease ratios of the non-plated samples. This correlation straight line is represented by y=0.1604x (where y is the cross section decrease ratio and x is the salt water spray time), and the square ($R^2$) of its correlation coefficient is 0.9896. FIG. 6 also shows a correlation straight line indicating the relation between the salt water spray time and the cross section decrease ratio, by the least square method, from a plot of the cross section decrease ratios of the plated samples. This correlation straight line is represented by y=0.0393x, and the square ($R^2$) of its correlation coefficient is 0.9937. Since the squares of the correlation coefficients of these correlation straight lines are extremely close to 1, it is possible to obtain a cross section decrease ratio in a salt water spray time at which measurement has not been performed, based on these correlation straight lines.

In test 1, a significant increase in resistance value was observed in the non-plated samples when the salt water spray time was 120 hours, and a significant increase in resistance value was observed in the plated samples when the salt water spray time was 480 hours. When 120 was substituted for x of the correlation straight line for the non-plated samples, a cross section decrease ratio of about 20% was obtained. Similarly, when 480 was substituted for x of the correlation straight line for the plated samples, a cross section decrease ratio of about 20% was also obtained. That is, it is considered that an increase in the resistance value of terminal-attached electric wire 1 occurs when the cross sectional area of conductor 20 decreases by 20%. This is synonymous with that, even if conductor 20 corrodes, the function as terminal-attached electric wire 1 (plated sample) is maintained as long as the cross section decrease ratio of conductor 20 is less than 20%. The fact that a certain degree of corrosion of conductor 20 is permitted in terminal-attached electric wire 1 proves that terminal-attached electric wire 1 of this example can be used in a non-waterproof environment.

<<Test 3>>

Figure 3:
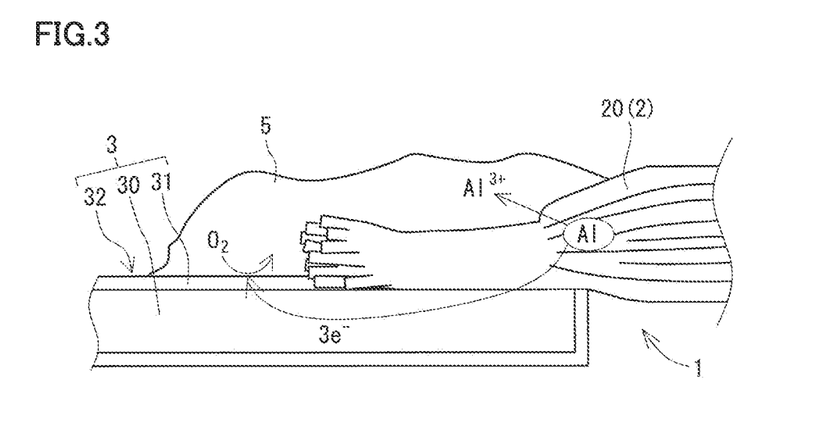
FIG. 3 is an explanatory diagram illustrating a mechanism of corrosion of a conductor.

As described based on FIG. 3, corrosion of conductor 20 is suppressed as oxide film 32 decreases the oxygen reduction current in the surface of terminal member 3. A test 3 examined the degree of growth of oxide film 32 in association with salt water spray, and how the oxygen reduction current changes depending on the thickness of oxide film 32.

In test 3, a plurality of plated samples were prepared. The salt water spray time for the plated samples was set to 0, 8, 16, 24, 32, 48, 96, 144, 192, 384, 432, or 480 hours. The number of samples for each time was set to 5.

Figure 7:
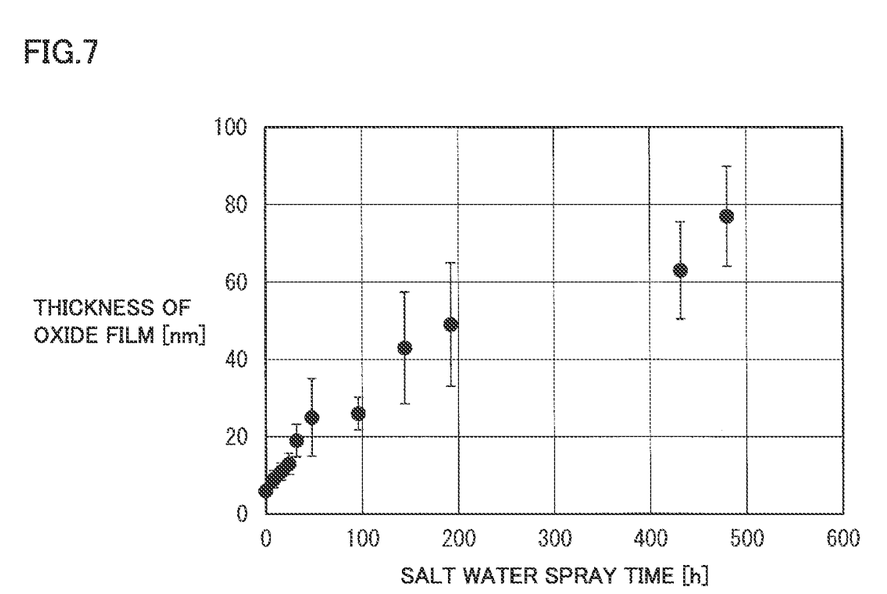
FIG. 7 is a graph of a test 3 showing the relation between the salt water spray time and a thickness of an oxide film.

The thickness (nm) of oxide film 32 of each plated sample was obtained by X-ray photoelectron spectroscopy. Specifically, a detection depth of oxygen (O) obtained by sputtering depth profile measurement was regarded as the thickness of oxide film 32. The measuring device used was Quantera SMX manufactured by ULVAC-PHI, Inc., X ray conditions were set as 100 μm, 25 W, and 15 kV, and an average sputtering rate was set to 24.39 nm/minute (calculated using the sputtering rate of $SiO_2$ measured in conformity with JIS K 0146:2002). FIG. 7 shows the result. In FIG. 7, the axis of abscissas represents the salt water spray time (h), and the axis of ordinates represents the thickness (nm) of oxide film 32. However, data at 384 hours is not provided in FIG. 7.

Naturally oxidized oxide film 32 for which the salt water spray time was set to 0, that is, which was not subjected to salt water spray, had a thickness of 6 nm. On the other hand, it was found that the thickness of oxide film 32 increases with an increase in the salt water spray time. In particular, it was found that oxide film 32 grows to have a thickness of around 20 nm by salt water spray for 32 to 48 hours. It was also found that oxide film 32 can reliably have a thickness of more than or equal to 20 nm by salt water spray for 96 hours.

Figure 8:
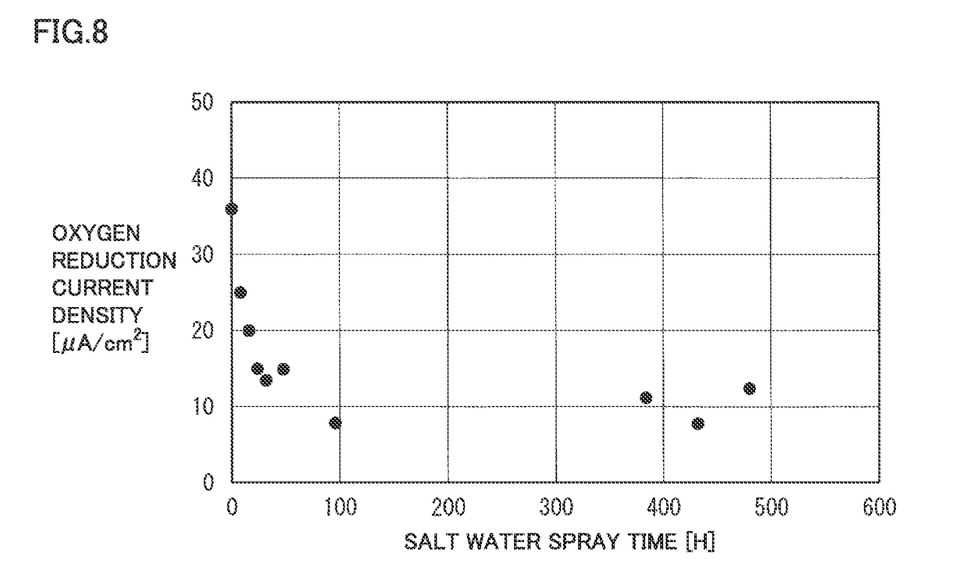
FIG. 8 is a graph of test 3 showing the relation between the salt water spray time and an oxygen reduction current flowing through a surface of the oxide film.

Subsequently, an oxygen reduction current density (μA/$cm^2$) in terminal member 3 was measured. Specifically, a portion other than electric wire 2 of a test piece cut at the position of electric wire portion 23 of each plated sample was immersed in a measurement solution, and was connected to a cyclic voltammetry device. Then, the oxygen reduction current density was obtained by measuring a current flowing through the test piece and a counter electrode by a linear sweep voltammetry method, and dividing a current flowing at a potential of −0.8 V relative to a reference electrode by the area of the portion immersed in the measurement solution in the test piece. The measurement solution used was a 5-mass % NaCl aqueous solution (salt water), the measurement potential was swept in a cathode direction using a natural immersion potential of the test piece as an initial potential, the reference electrode was made of Ag/AgCl, the counter electrode was made of Pt, and the sweep rate was set to 10 mV/s. FIG. 8 shows the result. In FIG. 8, the axis of abscissas represents the salt water spray time (h), and the axis of ordinates represents the oxygen reduction current density (μA/$cm^2$). However, data at 144 hours and 192 hours are not provided in FIG. 8.

As shown in FIG. 8, although the oxygen reduction current density decreases with an increase in the salt water spray time, the decrease of the oxygen reduction current density substantially stopped at salt water spray for 96 hours.

Figure 9:
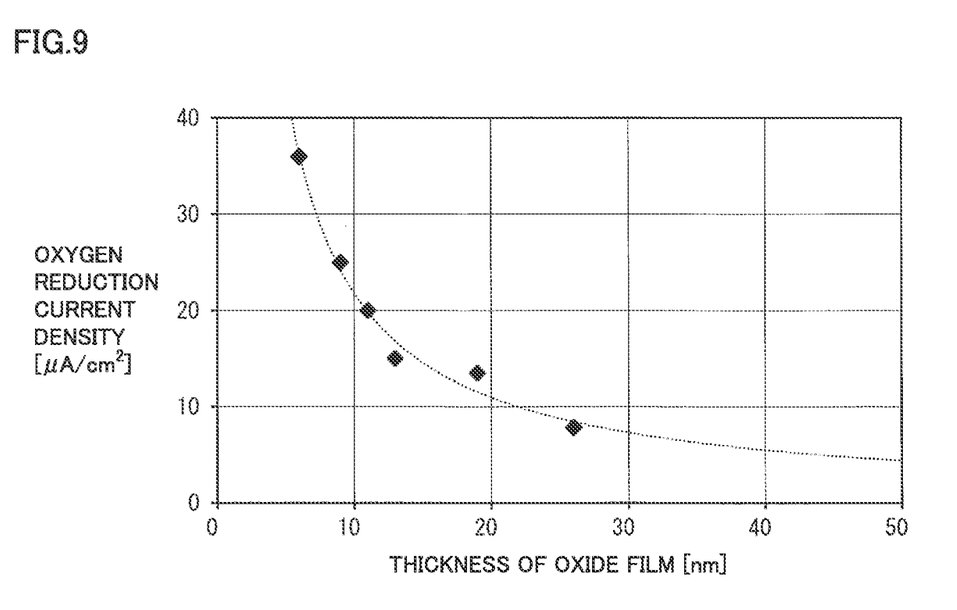
FIG. 9 is a graph of test 3 showing the relation between the thickness of the oxide film and the oxygen reduction current flowing through the surface of the oxide film.

Based on the graph of FIG. 9 showing the relation between the thickness of oxide film 32 and the oxygen reduction current density obtained from the data of FIGS. 7 and 8, it is found that the effect of decreasing the oxygen reduction current density starts to be saturated when oxide film 32 has a thickness of around 20 nm.

The result of test 3 revealed that it is effective to increase the thickness of oxide film 32 beforehand to suppress corrosion of conductor 20 of terminal-attached electric wire 1, and that a preferable thickness thereof is more than or equal to 20 nm. It was also revealed that, even in the case of increasing the thickness of oxide film 32 beforehand, the effect of suppressing corrosion of conductor 20 is less likely to be achieved when the thickness of oxide film 32 is increased unnecessarily.

REFERENCE SIGNS LIST

10: wire harness;
1: terminal-attached electric wire;
2: electric wire;
  20: conductor; 21: insulating layer; 22: welded portion; 23: electric wire portion; 2e: conductor-exposed portion; 2m: weld mark;
3: terminal member;
  30: main body; 31: coating layer; 32: oxide film; 3e: terminal-exposed portion; 3h: through hole; 3m: weld mark;
4: ultrasonic welding machine;
  40: receiving jig; 41: horn;
5: environmental water.

The invention claimed is:

1. A terminal-attached electric wire comprising:
an electric wire having a conductor made of aluminum or an aluminum alloy whose outer circumference is covered with an insulating layer; and
a terminal member made of copper or a copper alloy, and attached to a conductor-exposed portion exposed from the insulating layer at an end portion of the electric wire,
the terminal member including
  a coating layer made of an electrically conductive material, and formed at a terminal-exposed portion except for a place of contact with the conductor on a surface of the terminal member, and
  an oxide film of the electrically conductive material formed on a surface of the coating layer,
the electrically conductive material being a metal or an alloy which forms an oxide film having a thickness of more than or equal to 20 nm on a surface thereof when 50 g/L of salt water at 35° C. is sprayed for 96 hours in conformity with a salt water spray test defined by JIS Z 2371:2000,
the conductor-exposed portion and the terminal-exposed portion being bare and exposed to an outer circumferential atmosphere of the terminal-attached electric wire.

2. The terminal-attached electric wire according to claim 1, wherein the electrically conductive material is nickel, a nickel alloy, titanium, a titanium alloy, chromium, a chromium alloy, or stainless steel.

3. The terminal-attached electric wire according to claim 1, wherein the coating layer is made of a nickel plating or a nickel alloy plating.

4. The terminal-attached electric wire according to claim 1, wherein the conductor has a cross sectional area of more than or equal to 10 mm$^2$.

5. The terminal-attached electric wire according to claim 1, wherein the conductor is ultrasonic-welded to the terminal member.

6. The terminal-attached electric wire according to claim 1, wherein the oxide film has a thickness of more than or equal to 20 nm.

7. A wire harness comprising a plurality of the terminal-attached electric wires according to claim 1, which are bundled together.

* * * * *